US012686272B2

(12) United States Patent
Valentini

(10) Patent No.: US 12,686,272 B2
(45) Date of Patent: Jul. 21, 2026

(54) CONTROL UNIT SYSTEM AND APPLICATION FOR VEHICLES

(71) Applicant: Umberto Valentini, San Bruno, CA (US)

(72) Inventor: Umberto Valentini, San Bruno, CA (US)

( * ) Notice: Subject to any disclaimer, the term of this patent is extended or adjusted under 35 U.S.C. 154(b) by 95 days.

(21) Appl. No.: 18/796,774

(22) Filed: Aug. 7, 2024

(65) Prior Publication Data

US 2025/0058632 A1    Feb. 20, 2025

Related U.S. Application Data

(60) Provisional application No. 63/519,674, filed on Aug. 15, 2023.

(51) Int. Cl.
B60K 35/22 (2024.01)
B60K 35/10 (2024.01)
B60K 35/28 (2024.01)
G01C 22/02 (2006.01)

(52) U.S. Cl.
CPC .............. B60K 35/28 (2024.01); B60K 35/10 (2024.01); B60K 35/22 (2024.01); G01C 22/02 (2013.01); *B60K 2360/1438* (2024.01); *B60K 2360/145* (2024.01)

(58) Field of Classification Search
None
See application file for complete search history.

(56) References Cited

U.S. PATENT DOCUMENTS

| | | | |
|---|---|---|---|
| 5,809,437 A | 9/1998 | Breed | |
| 7,525,734 B2 | 4/2009 | Aoki | |
| 8,509,986 B1 | 8/2013 | Chen | |
| 8,892,302 B1 * | 11/2014 | McDonald | G08B 21/22 701/36 |
| 10,652,935 B1 | 5/2020 | Kennedy | |
| 11,708,083 B2 * | 7/2023 | Yamanouchi | B60Q 1/0076 701/23 |
| 2005/0043869 A1 | 2/2005 | Funkhouser | |
| 2009/0174682 A1 * | 7/2009 | Bowden | G06F 3/04886 345/173 |
| 2020/0406915 A1 * | 12/2020 | Yamanouchi | B60Q 1/0076 |
| 2020/0406931 A1 * | 12/2020 | Ide | B60W 60/0053 |
| 2020/0406932 A1 * | 12/2020 | Yamanouchi | B60W 60/0015 |

(Continued)

*Primary Examiner* — James M McPherson
(74) *Attorney, Agent, or Firm* — Brennan, Manna & Diamond, LLC

(57) ABSTRACT

A multipurpose wireless speedometer system designed for vehicles, including cars and motorcycles, is disclosed. The system includes a touch display unit that functions as a speedometer, GPS, and diagnostic display and features an internal memory, a GPS unit, a tracker module, a wireless module, and a processor. The touch display unit is customizable and can display different user interfaces based on preferences. The system also includes a controller with multiple buttons for managing signals, lights, and other vehicle functions. A control unit serves as a central hub and receives Bluetooth signals from the controller and transmits commands to vehicle systems. The control unit is equipped with relay elements and LED indicators for active status and malfunction alerts. The system wirelessly communicates between components and automatically powers on with the vehicle's ignition.

18 Claims, 6 Drawing Sheets

(56)  References Cited

U.S. PATENT DOCUMENTS

| | | | |
|---|---|---|---|
| 2020/0406935 A1* | 12/2020 | Yamanouchi ... | B60W 60/00253 |
| 2021/0284078 A1* | 9/2021 | Hinchman .............. | B60Q 3/80 |
| 2021/0316764 A1* | 10/2021 | Jung ..................... | B60K 35/25 |
| 2021/0370775 A1 | 12/2021 | Yamada | |
| 2022/0069362 A1* | 3/2022 | Kumeuchi ........... | H01M 10/06 |
| 2023/0148498 A1* | 5/2023 | Heaney .................. | B05B 1/267 |
| | | | 700/284 |
| 2024/0414404 A1* | 12/2024 | Park .................. | H04N 21/4786 |

* cited by examiner

CONTROL UNIT SYSTEM AND APPLICATION FOR VEHICLES

CROSS-REFERENCE TO RELATED APPLICATION

The present application claims priority to, and the benefit of, U.S. Provisional Application No. 63/519,674, which was filed on Aug. 15, 2023, and is incorporated herein by reference in its entirety.

FIELD OF THE INVENTION

The present invention generally relates to the field of vehicle instrumentation. More specifically, the present invention relates to a multipurpose wireless speedometer system designed for cars, trucks, and motorcycles, and other types of vehicles. The system includes four parts: an application, a wireless controller, a wireless control unit and wireless brake sensors. The application can be installed on smartphone or tablet, offering customizable interfaces for displaying vehicle diagnostics, speed, signals, lights, and GPS navigation. A controller enables users to manage vehicle functions wirelessly and a control unit acts as a central hub and receives Bluetooth signals and transmits commands to vehicle systems and the display unit. The brakes sensors when activated send Bluetooth signal to the control unit that activate the stop light. Accordingly, the present disclosure makes specific reference thereto. Nonetheless, it is to be appreciated that aspects of the present invention are also equally applicable to other like applications, devices, and methods of manufacture.

BACKGROUND

By way of background, standard speedometer units in vehicles are typically wired directly into the vehicle's electrical system and are limited in the information they display, such as speed and basic diagnostic. Replacing standard speedometer units can be a cumbersome and time-consuming task, often requiring professional assistance for both installation and diagnosis of vehicle issues. Moreover, the conventional speedometers do not provide comprehensive vehicle data, making it difficult for vehicle owners to monitor and understand their vehicle's performance and health.

Vehicle owners, including those of cars, trucks, motorcycles, and other types of vehicles, are increasingly seeking more intuitive and multifunctional speedometer units. These advanced units would not only display speed but also provide additional utility and functions, such as GPS navigation, real-time diagnostics, customizable interfaces, and wireless connectivity. Accordingly, individuals desire an innovative, multi-purpose and easy-to-install speedometer system.

Therefore, there exists a long-felt need in the art for an innovative and versatile speedometer system for vehicles that overcomes the limitations of traditional wired speedometers. There is also a long-felt need in the art for a speedometer unit that provides comprehensive vehicle information, including real-time diagnostics, GPS navigation, and customizable user interfaces. Additionally, there is a long-felt need in the art for a speedometer system that can be easily installed and operated without requiring professional assistance. Moreover, there is a long-felt need in the art for a system that wirelessly communicates with various vehicle components, ensuring seamless integration and functionality. Furthermore, there is a long-felt need in the art for a speedometer system that is suitable for a wide range of vehicles including cars, trucks, and motorcycles. Finally, there is a long-felt need in the art for a comprehensive speedometer system that enhances vehicle management and provides additional utility, offering vehicle owners better control and understanding of their vehicle's performance and health.

The subject matter disclosed and claimed herein, in one embodiment thereof, comprises a multipurpose wireless speedometer system for vehicles. The speedometer system includes a touch display unit configured to display vehicle diagnostics, speed, signals, lights, and GPS information, a controller configured to customize settings and manage signals, lights, and other vehicle functions, and a control unit adapted to receive inputs from the controller and send corresponding commands to different vehicle systems, wherein the touch display unit, the controller, and the control unit communicate wirelessly. The control unit includes a 12V connector for connecting the control unit to a 12V power source of the vehicle and relay elements for relaying the inputs from the controller to the vehicle. The controller comprises a plurality of buttons including signal indicator buttons, headlamp adjusting buttons, and a horn button, each button is individually operable to activate (i.e., actuate) a corresponding functionality in the vehicle.

In this manner, the multipurpose wireless speedometer system of the present invention accomplishes all of the foregoing objectives and provides a novel solution for advanced vehicle monitoring. The system includes a touch display unit that functions like a smartphone, offering customizable interfaces for displaying vehicle diagnostics, speed, signals, lights, and GPS navigation. The controller is equipped with various buttons and enables users to manage vehicle functions wirelessly. The control unit acts as a central hub and receives Bluetooth signals from the controller and transmitting commands to vehicle systems.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a multipurpose wireless speedometer system for vehicles. The speedometer system includes a touch display unit configured to display vehicle diagnostics, speed, signals, lights, and GPS information, a controller configured to customize settings and manage signals, lights, and other vehicle functions, and a control unit adapted to receive inputs from the controller and send corresponding commands to different vehicle systems, wherein the touch display unit, the controller, the brakes sensors and the control unit communicate wirelessly.

In yet another embodiment, the touch display unit includes an internal memory for storing system software, user settings, and historical data, a GPS unit for providing precise location data and navigation, a tracker module for monitoring vehicle speed and distance traveled (i.e., odometer), a wireless module for connecting to the control unit and providing internet access, and a processor for managing user interfaces and processing signals from the GPS unit, wireless module, and other sensors.

In another aspect, a method for operating a multipurpose wireless speedometer system in a vehicle is described. The method includes the steps of receiving a user input from a controller to activate (i.e., actuate) a vehicle function, transmitting the user input as an encoded Bluetooth signal to a control unit, processing the signal in the control unit and activating the corresponding vehicle function, transmitting the status of the vehicle function to a touch display unit, and displaying the status of the vehicle function on the touch display unit.

In still another aspect, the controller is configured to customize settings of the system and manage signals, lights, and other vehicle functions and comprises a plurality of buttons including signal indicator buttons, headlamp adjusting buttons, and a horn button, each button individually operable to activate (i.e., actuate) a corresponding functionality in the vehicle and an internal battery for powering the controller, rechargeable via a 5V charging port of the vehicle.

In another embodiment, the control unit is adapted to receive inputs from the controller and send corresponding commands to different vehicle systems and display unit. The control unit includes a 12V connector for connecting the control unit to a 12V power source of the vehicle, relay elements corresponding to the signal indicator buttons, headlamp adjusting buttons, and horn button of the controller, a first LED light for indicating the active status of the control unit and a second LED light for indicating malfunction in any of the relay elements, wherein the control unit functions as a central hub that receives Bluetooth signals from the controller and transmits corresponding commands to different vehicle systems.

In still another embodiment, the system is adapted to automatically power on the touch display unit when the vehicle's ignition is initiated, and the touch display unit provides additional functionalities including a mileage tracker (i.e., odometer), GPS tracker, and real-time vehicle diagnostics using installed monitoring applications.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
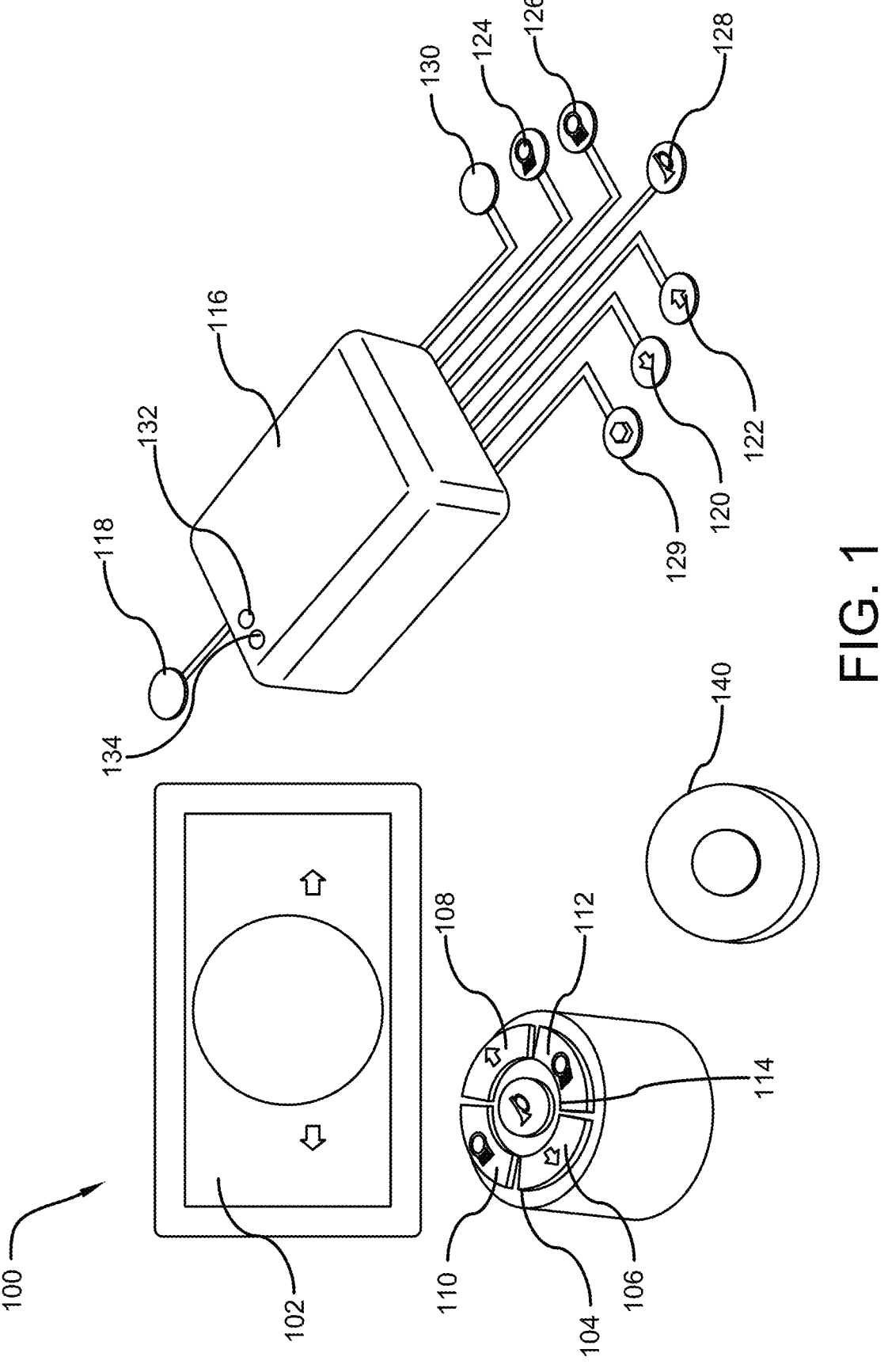
FIG. 1 illustrates a perspective view of the multipurpose wireless speedometer system of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an innovative and versatile speedometer system for vehicles that overcomes the limitations of traditional wired speedometers. There is also a long-felt need in the art for a speedometer unit that provides comprehensive vehicle information, including real-time diagnostics, GPS navigation, and customizable user interfaces. Additionally, there is a long-felt need in the art for a speedometer system that can be easily installed and operated without requiring professional assistance. Moreover, there is a long-felt need in the art for a system that wirelessly communicates with various vehicle components, ensuring seamless integration and functionality. Furthermore, there is a long-felt need in the art for a speedometer system that is suitable for a wide range of vehicles including cars, trucks, and motorcycles. Finally, there is a long-felt need in the art for a comprehensive speedometer system that enhances vehicle management and provides additional utility, offering vehicle owners better control and understanding of their vehicle's performance and health.

The present invention, in one exemplary embodiment, is a method for operating a multipurpose wireless speedometer system in a vehicle. The method includes the steps of receiving a user input from a controller to activate (i.e., actuate) a vehicle function, transmitting the user input as an encoded Bluetooth signal to a control unit, processing the signal in the control unit and activating the corresponding vehicle function, transmitting the status of the vehicle function to a touch display unit, and displaying the status of the vehicle function on the touch display unit.

Reference will now be made in detail to the present preferred embodiments of the invention, examples of which are illustrated in the accompanying drawings. Wherever possible, the same reference numerals are used in the drawings and the description to refer to the same or like parts.

Referring initially to the drawings, FIG. 1 illustrates a perspective view of the multipurpose wireless speedometer system of the present invention in accordance with the disclosed structure. The multipurpose wireless speedometer system 100 of the present invention is designed as an innovative speedometer device designed for vehicles, including cars and motorcycles. The speedometer system 100 is adapted to display information such as vehicle diagnostics, speed, signals, lights, and more and can also function as a GPS unit. More specifically, the system 100 includes a touch display unit 102 which functions like a smartphone or electronic mobile device and can be integrated to dashboard of a vehicle for easy operation and use. The display unit 102 can be made in different shapes and sizes for easy installation on different types of vehicles. The information displayed on the touch display unit 102 can be customized as per requirements of a user for providing customized use of the system 100. The display unit 102 can use a display technology such as LED, LCD, OLED, and more for providing a clear touch display to users.

A controller 104 is included in the system 100 for customizing settings of the system 100 and to manage signals, lights, and other functions of the vehicle. As illustrated, two signal indicator buttons 106, 108, two headlamp adjusting buttons 110, 112, and a horn button 114 are disposed on the controller 104. Each button can be individually pushed (i.e., independently actuated) for activating the corresponding functionality in the vehicle. It will be apparent to a person skilled in the art that additional controls can be added to the controller 104 depending on the vehicle for which the advanced vehicle monitoring speedometer system 100 is designed. The controller buttons are preferably physical button but can be touch buttons as well. In the preferred embodiment, the controller 104 includes an internal battery and can be charged by plugging the charger into a conventional 5V port of the vehicle.

A control unit 116 is adapted to activate (i.e., actuate) the corresponding signal in the vehicle based on the input received from the controller 104. The control unit 116 is adapted to include a 12V connector 118 which is used for connecting the control unit 116 into the 12V power source of vehicles. The control unit 116 functions as the central hub that receives Bluetooth signals from the controller 104 and sends corresponding commands to different vehicle systems. The control unit 116 includes a pair of relay elements 120, 122 corresponding to signal indicator buttons 106, 108, another pair of relay elements 124, 126 for headlamp adjusting buttons 110, 112, a relay element 128 for the horn button 114, and a relay element 129 for the brake trigger (i.e., actuator) 140. The control unit 116 is also adapted to transmit information of a vehicle's signal activation to the display unit 102. The control unit 116 includes an audible confirmation when transmitting information from a vehicle's signal activation to the display unit 102. Accordingly, the display unit 102 displays a visual indicator of the signal to the driver. The transmission can take place wirelessly or using the 12V output port 130.

In the preferred embodiment, the controller 104 transmits a Bluetooth signal to the control unit 116 with the encoded input from the controller 104. The display unit 102 functions as a speedometer and can be automatically powered on when the vehicle's ignition is initiated. The speedometer display 102 also provides additional functionalities such as mileage tracker (i.e., odometer), GPS tracker, and more.

The control unit 116 is portable and can be detachably attached to the vehicle's 12V power supply. The control unit 116 includes a first LED light 132 for indicating active status of the control unit 116 and a second LED light 134 when illuminates indicate the malfunctioned control unit 116. Malfunction in any of the relays of the control unit 116 can result in illumination of the second LED light 134.

Figure 2:
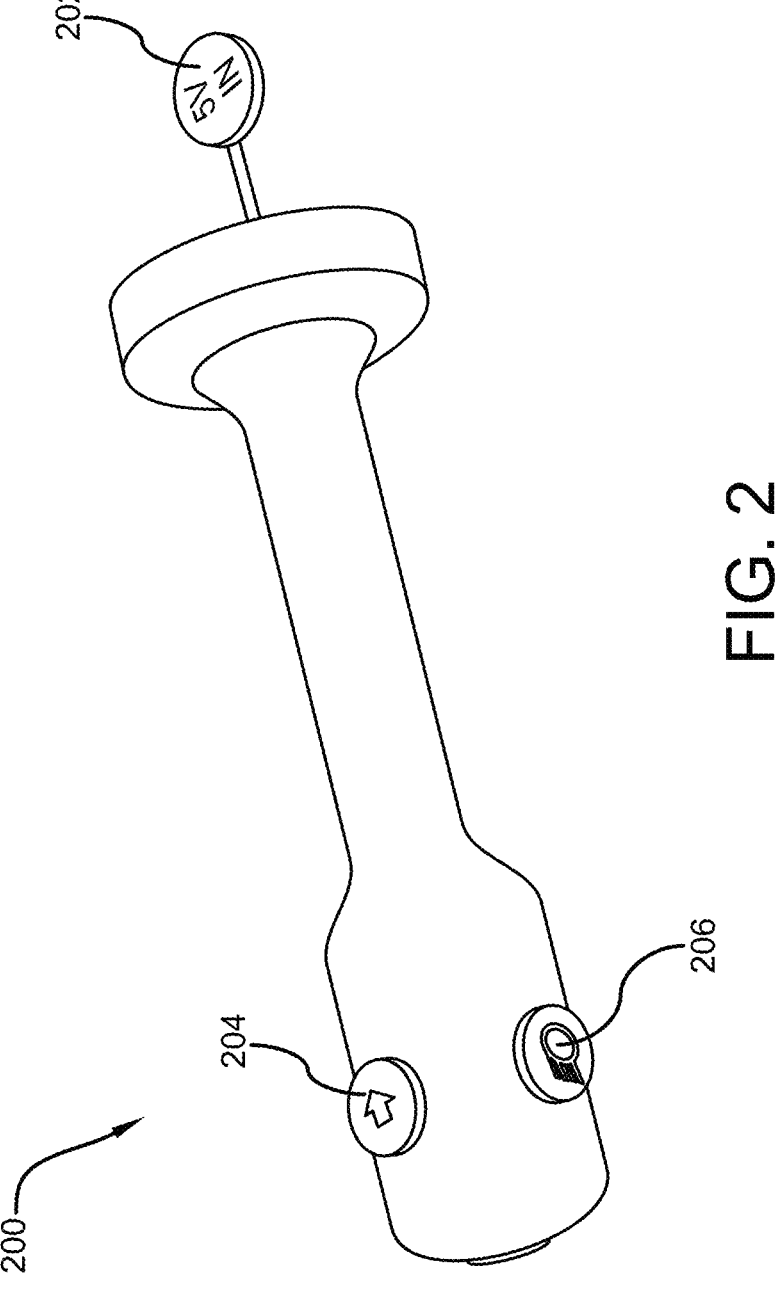
FIG. 2 illustrates another embodiment of the controller used for the system of the present invention in accordance with the disclosed structure.

FIG. 2 illustrates another embodiment of the controller used for the system of the present invention in accordance with the disclosed structure. As illustrated, the controller 200 can be used with internal battery or can also be powered by inserting into 5V charging port of the vehicle using the 5V input connector 202. The controller 200 can be designed to fit different types of vehicles and include the control buttons described above in FIG. 1. As an example, a signal button 204 and a light button 206 are shown on the controller 200 for relaying the signal through the control unit 116 as discussed in FIG. 1. Any shape, size, material, and design of the controller of the system 100 falls under the scope of the present disclosure without navigating from the functionality thereof.

Figure 3:
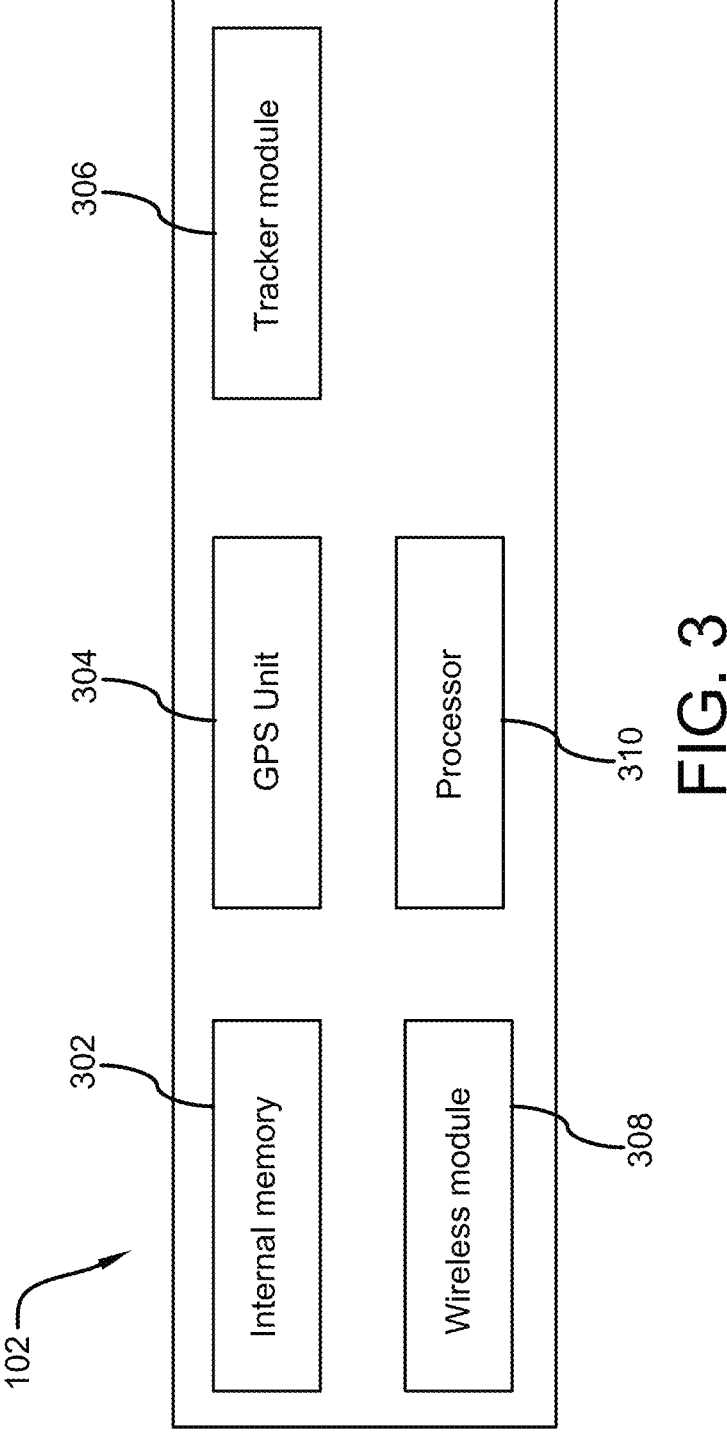
FIG. 3 illustrates a block diagram depicting internal components included in the touch display unit of the present invention in accordance with the disclosed structure.

FIG. 3 illustrates a block diagram depicting internal components included in the touch display unit 102 of the present invention in accordance with the disclosed structure. As illustrated, the speedometer display unit 102 includes an internal memory 302 which is adapted to store essential data, including system software, user settings, and historical data such as speed logs, distance traveled (i.e., odometer), and route information. Any additional downloaded applications such as OBD2 applications are also stored in the internal memory 302 of the display unit 102. A GPS unit 304 is integrated in the speedometer display unit 102 and enhances the functionality of the speedometer 102 by offering precise location data, which can be used for navigation and tracking purposes.

A tracker module 306 is configured to continuously monitor the vehicle's speed using data from GPS and onboard sensors. The module 306 also keeps track of the total distance traveled (i.e., odometer) by the vehicle and provides real-time feedback on speed and distance, displayed on the screen unit 102. A wireless module 308 provides wireless connectivity to the control unit 116 of the system 100. The module 308 also enables internet access for downloading maps, software updates, and accessing online services. The speedometer display unit 102 can include an operating system such as Android, Apple, and more and utility applications can be downloaded from the corresponding application store thereof. The display can also show real time car diagnostic information on installation of one or more monitoring applications such as OBD2 application.

A processor 310 embedded in the display unit 102 manages different user interfaces displayed by the display unit 102, ensuring that all data is presented clearly and accurately on the screen. The processor 310 also handles all computations, including processing signals from the GPS unit, wireless module, and other sensors.

Figures 4A, 4B, 4C:
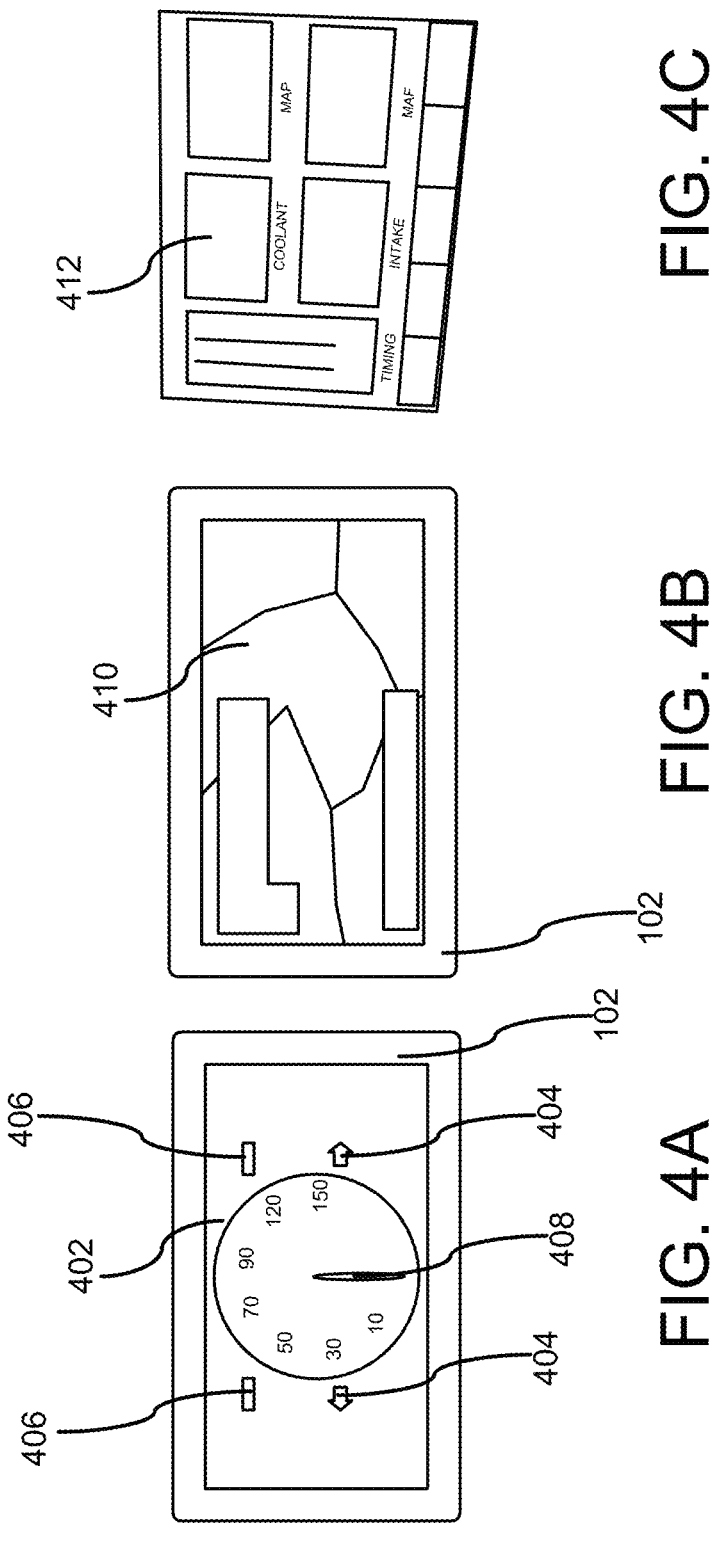
FIGS. 4A, 4B, and 4C illustrate different exemplary user interfaces displayed by the wireless speedometer unit of the present invention in accordance with the disclosed structure.

FIGS. 4A, 4B, and 4C illustrate different exemplary user interfaces displayed by the wireless speedometer unit of the present invention in accordance with the disclosed structure. When the display unit 102 is powered on automatically on ignition of the vehicle, the speedometer interface 402 is initially displayed. In the preferred embodiment, a plurality of different speedometer interfaces are available in the system 100 and anyone can be chosen by the user based on the preferences thereof. The speedometer interface 402 mimics the conventional speedometer and provides blinking light indications 404, speed indicator 406, and speedometer marking 408. Any other indicator corresponding to fuel, brake, oil, and more may also be displayed on the interface 402.

A digital map navigator 410 can be displayed by the speedometer display unit 102 as illustrated in FIG. 4B. The digital map navigator 410 can be built-in in the display unit 102 or can also be downloaded from an external source. The display unit 102 is also configured to display real-time vehicle vitals or parameters 412 such as coolant level, wheel alignment, battery level, and more using the installed monitoring application such as an OBD2 application.

Figure 5:
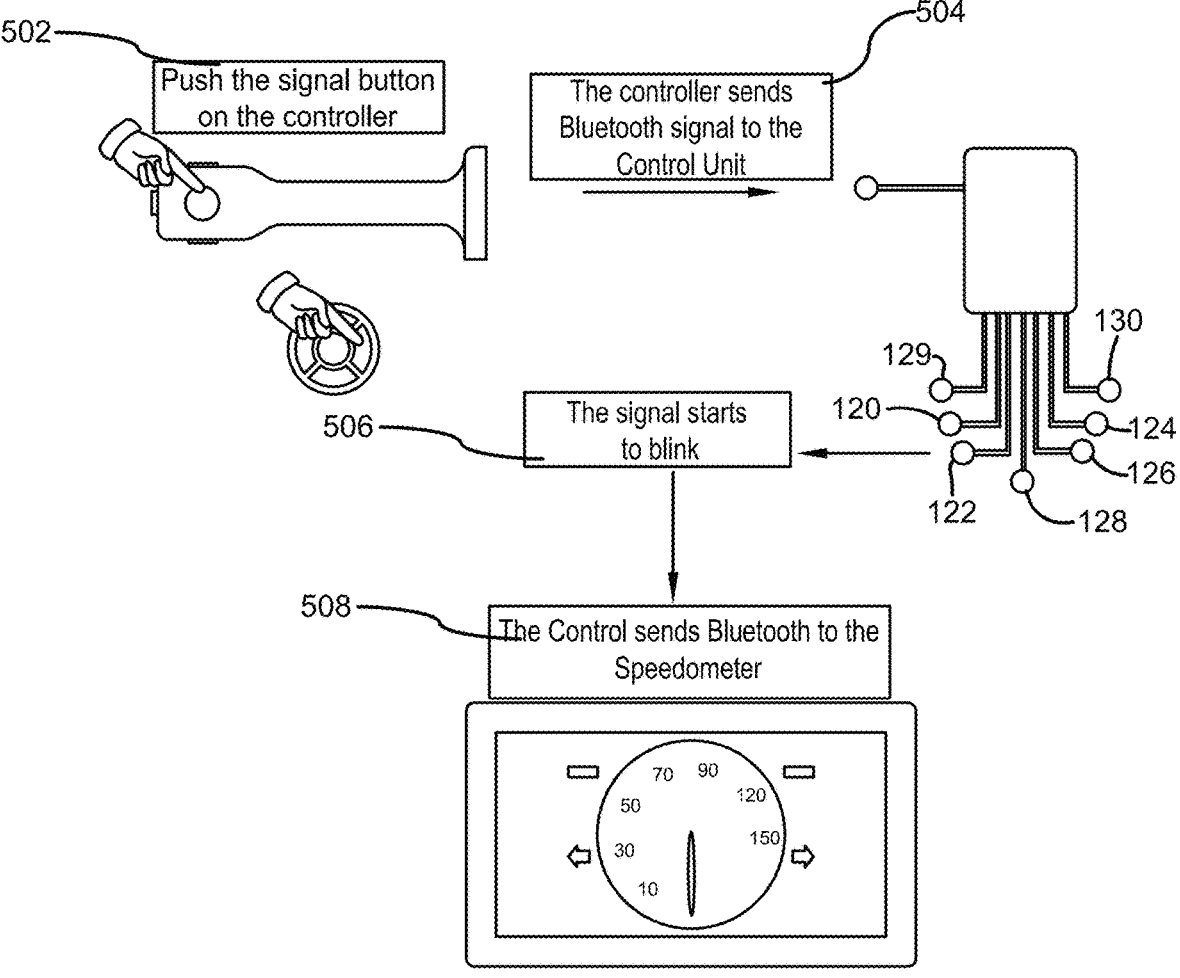
FIG. 5 illustrates a flow diagram showing the operation of the multifunctional system of the present invention for blinking lights of the vehicle and displaying on the speedometer unit in accordance with the disclosed structure.

FIG. 5 illustrates a flow diagram showing the operation of the multifunctional system of the present invention for blinking lights of the vehicle and displaying on the speedometer unit in accordance with the disclosed structure. As illustrated, in the first step 502, a user pushes the control button 204 on the controller 200. Any controller of the system 100 can be used for giving an input to the system. In the second step 504, the input from the controller 200 is sent in an encoded form via a Bluetooth signal to the control unit 116. The control unit 116 is the central hub of the system 100 and in the third step 506, relays the signal to the vehicle enabling the corresponding vehicle part to activate (i.e., actuate) which is blinking of the vehicular side signal in this case. Finally, in the step 504, the corresponding signal is sent to the speedometer display unit 102 by the control hub 116 for indicating the signal in the speedometer display unit 102.

Figure 6:
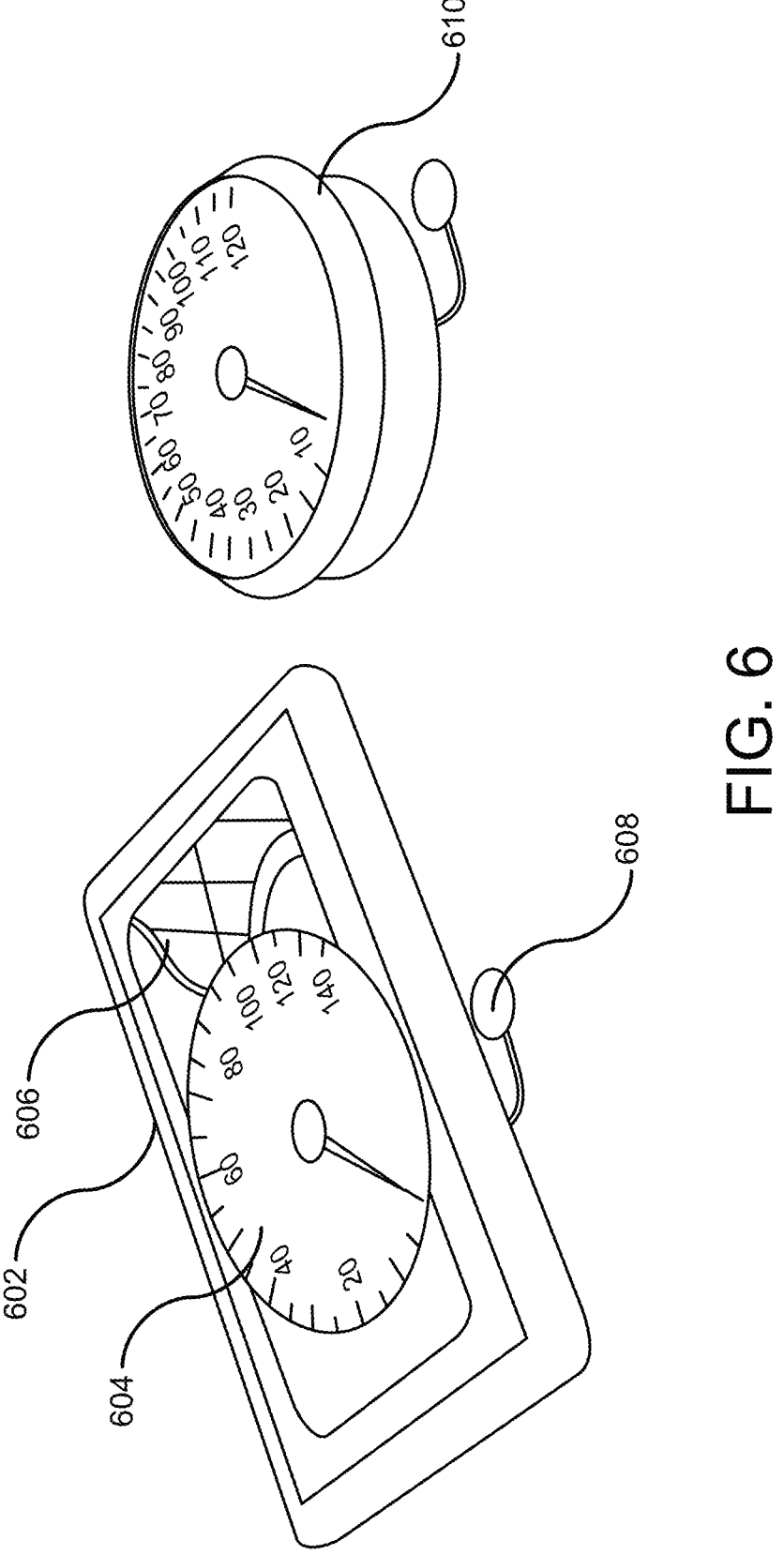
FIG. 6 illustrates a perspective view of different versions of the speedometer unit used in the multipurpose wireless speedometer system of the present invention in accordance with the disclosed structure.

FIG. 6 illustrates a perspective view of different versions of the speedometer unit used in the multipurpose wireless speedometer system of the present invention in accordance with the disclosed structure. As illustrated, the speedometer unit can come in different sizes, shapes, and designs to fit different vehicles. The unit 602 includes the speedometer interface 604 overlapping on the digital map 606. The unit 602 can also be battery powered or powered by the 5V input connector 608. The speedometer unit 610 is designed for motorbikes and resemble the circular speedometer of the bikes.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "advanced vehicle monitoring speedometer system", "multipurpose wireless speedometer system", "speedometer system", and "system" are interchangeable and refer to the advanced vehicle monitoring multi-functional speedometer system 100 of the present invention.

Notwithstanding the forgoing, the advanced vehicle monitoring multi-functional speedometer system 100 of the present invention can be of any suitable size and configuration as is known in the art without affecting the overall concept of the invention, provided that it accomplishes the above stated objectives. One of ordinary skill in the art will appreciate that the advanced vehicle monitoring multi-functional speedometer system 100 as shown in the FIGS. are for illustrative purposes only, and that many other sizes and shapes of the advanced vehicle monitoring multi-functional speedometer system 100 are well within the scope of the present disclosure. Although the dimensions of the advanced vehicle monitoring multi-functional speedometer system 100 are important design parameters for user convenience, the advanced vehicle monitoring multi-functional speedometer system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicular speedometer and operating system comprising:

a display unit;

a vehicle controller;

a control unit; and a wireless module configured to provide wireless connectivity for the control unit; and wherein said display unit is a touch display unit;

wherein said touch display unit having a display selected from the group consisting of an LED, an LCD, and an OLED;

wherein said touch display unit having a vehicular speed indicator;

wherein said vehicle controller having at least two signal indicator buttons, at least two headlamp adjusting buttons, a brake button, and a horn button for managing a corresponding functionality of a vehicle;

wherein each of said at least two signal indicator buttons, said at least two headlamp adjusting buttons, said brake button, and said horn button independently actuated for activating the corresponding functionality of the vehicle;

wherein said control unit actuates the corresponding functionality of the vehicle based on an input received from said vehicle controller;

wherein said control unit having a speedometer interface for tracking a vehicular speed; and wherein said control unit having a 12V connector for connecting said control unit to a 12V power source of the vehicle;

wherein said vehicle controller is configured to charge via a 5V port of the vehicle; and wherein the control module is configured to actuate a plurality of relay elements in response to an encoded signal without requiring integration with the vehicle controller.

2. The vehicular speedometer and operating system of claim 1, wherein said vehicle controller buttons are physical buttons.

3. The vehicular speedometer and operating system of claim 1, wherein said vehicle controller buttons are touch buttons.

4. The vehicular speedometer and operating system of claim 2, wherein said vehicle controller having a rechargeable battery.

5. The vehicular speedometer and operating system of claim 1, wherein said control unit receiving Bluetooth signals from said vehicle controller and transmits corresponding signals to the corresponding functionality of the vehicle.

6. The vehicular speedometer and operating system of claim 5, wherein said control unit having a first pair of relay elements corresponding to said signal indicator buttons, a second pair of relay elements corresponding to said headlamp adjusting buttons, a third relay element corresponding to said brake button, and a fourth relay element corresponding to said horn button.

7. The vehicular speedometer and operating system of claim 6, wherein said control unit transmits information of a vehicle's signal activation to said touch display unit.

8. The vehicular speedometer and operating system of claim 7, wherein said touch display unit having a visual indicator of said vehicle's signal to a driver.

9. The vehicular speedometer and operating system of claim 8, wherein said vehicle controller transmits a Bluetooth signal to said control unit including an encoded input from said vehicle controller.

10. The vehicular speedometer and operating system of claim 9, wherein said touch display unit having a speedometer display for indicating a speed of the vehicle.

11. The vehicular speedometer and operating system of claim 10, wherein said touch display unit having a GPS tracker.

12. The vehicular speedometer and operating system of claim 11, wherein said control unit having a mileage tracker interface for tracking a vehicle odometer.

13. The vehicular speedometer and operating system of claim 12, wherein said control unit selectively detachable from the 12V power source of the vehicle for portability.

14. A vehicular speedometer and operating system comprising:
   a display unit;
   a vehicle controller;
   a control unit; and
   a wireless module configured to provide wireless connectivity for the control unit; and
   wherein said display unit is a touch display unit;
   wherein said touch display unit having a display selected from the group consisting of an LED, an LCD, and an OLED;
   wherein said touch display unit having a vehicular speed indicator;
   wherein said vehicle controller having at least two signal indicator buttons, at least two headlamp adjusting buttons, and a horn button for managing a corresponding functionality of a vehicle;
   wherein each of said at least two signal indicator buttons, said at least two headlamp adjusting buttons, and said horn button independently actuated for activating the corresponding functionality of the vehicle;

wherein said control unit actuates the corresponding functionality of the vehicle based on an input received from said vehicle controller;
   wherein said control unit having a speedometer interface for tracking a vehicular speed;
   wherein said control unit having a 12V connector for connecting said control unit to a 12V power source of the vehicle; and
   wherein said control unit receiving Bluetooth signals from said vehicle controller and transmits corresponding signals to the corresponding functionality of the vehicle;
   wherein said vehicle controller is configured to charge via a 5V port of the vehicle; and
   wherein the display unit is configured to display a plurality of real-time vehicle parameters comprising a coolant level, a wheel alignment, and a battery level.

15. The vehicular speedometer and operating system of claim 14, wherein said control unit having a first pair of relay elements corresponding to said signal indicator buttons, a second pair of relay elements corresponding to said headlamp adjusting buttons, and a third relay element corresponding to said horn button.

16. The vehicular speedometer and operating system of claim 14, wherein said control unit transmits information of a vehicle's signal activation to said touch display unit.

17. A vehicular speedometer and operating system comprising:
   a display unit;
   a vehicle controller;
   a control unit; and
   a wireless module configured to provide wireless connectivity for the control unit; and
   wherein said display unit is a touch display unit;
   wherein said touch display unit having a display selected from the group consisting of an LED, an LCD, and an OLED;
   wherein said vehicle controller having at least two signal indicator buttons, at least two headlamp adjusting buttons, and a horn button for managing a corresponding functionality of a vehicle;
   wherein each of said at least two signal indicator buttons, said at least two headlamp adjusting buttons, and said horn button independently actuated for activating the corresponding functionality of the vehicle;
   wherein said control unit actuates the corresponding functionality of the vehicle based on an input received from said vehicle controller;
   wherein said control unit having a speedometer interface for tracking a vehicular speed;
   wherein said control unit having a 12V connector for connecting said control unit to a 12V power source of the vehicle;
   wherein said control unit receiving Bluetooth signals from said vehicle controller and transmits corresponding signals to the corresponding functionality of the vehicle; and
   wherein said touch display unit having a speedometer display for indicating a speed of the vehicle; and
   wherein the display unit is configured to display a plurality of real-time vehicle parameters comprising a coolant level, a wheel alignment, and a battery level.

18. The vehicular speedometer and operating system of claim 17, wherein said touch display unit having a GPS tracker.

* * * * *